United States Patent
Mayer et al.

(10) Patent No.: US 11,548,506 B2
(45) Date of Patent: Jan. 10, 2023

(54) ADAPTIVE CRUISE CONTROL

(71) Applicant: Ford Global Technologies, LLC, Dearborn, MI (US)

(72) Inventors: Grant Patrick Mayer, Canton, MI (US); Andrew Denis Lewandowski, Sterling Heights, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 541 days.

(21) Appl. No.: 16/267,439

(22) Filed: Feb. 5, 2019

(65) Prior Publication Data

US 2020/0247409 A1 Aug. 6, 2020

(51) Int. Cl.
| | | |
|---|---|---|
| *B60W 30/16* | (2020.01) | |
| *B60W 30/18* | (2012.01) | |
| *G08G 1/16* | (2006.01) | |
| *G06V 20/56* | (2022.01) | |

(52) U.S. Cl.
CPC .... *B60W 30/162* (2013.01); *B60W 30/18163* (2013.01); *G06V 20/588* (2022.01); *G08G 1/167* (2013.01); *B60W 2554/4041* (2020.02); *B60W 2554/801* (2020.02)

(58) Field of Classification Search
CPC ............................................. B60W 2554/4045
See application file for complete search history.

(56) References Cited

U.S. PATENT DOCUMENTS

| | | | |
|---|---|---|---|
| 6,304,811 B1* | 10/2001 | Prestl | B60K 31/0008 |
| | | | 701/96 |
| 9,092,987 B2 | 7/2015 | Bone et al. | |
| 2004/0193374 A1* | 9/2004 | Hac | B60W 10/06 |
| | | | 701/301 |
| 2011/0196592 A1* | 8/2011 | Kashi | B60W 30/16 |
| | | | 701/96 |
| 2012/0078484 A1* | 3/2012 | Kato | B60W 30/143 |
| | | | 701/96 |
| 2016/0221575 A1 | 8/2016 | Posch et al. | |

(Continued)

FOREIGN PATENT DOCUMENTS

| | | |
|---|---|---|
| DE | 102016216772 A1 | 3/2018 |
| EP | 3208739 A1 | 8/2017 |

(Continued)

OTHER PUBLICATIONS

Mar, The Car-Following and Lane-Changing Collision Prevention System Based on the Cascaded Fuzzy Inference System, May 2005, IEEE Transactions on Vehicular Technology, vol. 54, No. 3 (Year: 2005).*

(Continued)

*Primary Examiner* — Christian Chace
*Assistant Examiner* — Scott R Jagolinzer
(74) *Attorney, Agent, or Firm* — Frank A. MacKenzie; Bejin Bieneman PLC

(57) ABSTRACT

A system includes a processor and a memory storing instructions executable by the processor to select a distance based on a determination of whether a lane adjacent a primary vehicle and a secondary vehicle in front of the primary vehicle is clear. The instructions include instructions to actuate a braking system of the primary vehicle when the primary vehicle is at the distance from the secondary vehicle.

11 Claims, 3 Drawing Sheets

(56) References Cited

U.S. PATENT DOCUMENTS

| | | | |
|---|---|---|---|
| 2017/0355368 A1 | 12/2017 | O'Dea et al. | |
| 2018/0118176 A1* | 5/2018 | Lesher | B60T 7/22 |
| 2018/0170384 A1* | 6/2018 | Masui | G01S 13/86 |
| 2018/0178796 A1* | 6/2018 | Fukuda | B60W 30/16 |
| 2018/0178802 A1* | 6/2018 | Miyata | B60W 10/06 |
| 2019/0202458 A1* | 7/2019 | Konishi | B60W 30/18163 |
| 2019/0367026 A1* | 12/2019 | Hattori | G05D 1/0088 |
| 2019/0384305 A1* | 12/2019 | Niibo | B60W 30/18163 |
| 2020/0180633 A1* | 6/2020 | Wu | B60W 30/16 |
| 2020/0189598 A1* | 6/2020 | Eigel | B60W 10/184 |

FOREIGN PATENT DOCUMENTS

| | | |
|---|---|---|
| KR | 101345209 B1 * | 12/2013 |
| WO | 2015176723 A1 | 11/2015 |

OTHER PUBLICATIONS

Translation of previously cited KR101345209 "Choi" (Year: 2013).*

* cited by examiner

ADAPTIVE CRUISE CONTROL

BACKGROUND

Autonomous and partially autonomous vehicles can perform operations such as setting or maintaining a vehicle velocity, following a particular route, and maintaining a specified distance from other vehicles. A vehicle velocity can be set and maintained according to user input and/or based on a reference vehicle, typically an immediately preceding vehicle.

DETAILED DESCRIPTION

Introduction

Figure 1:
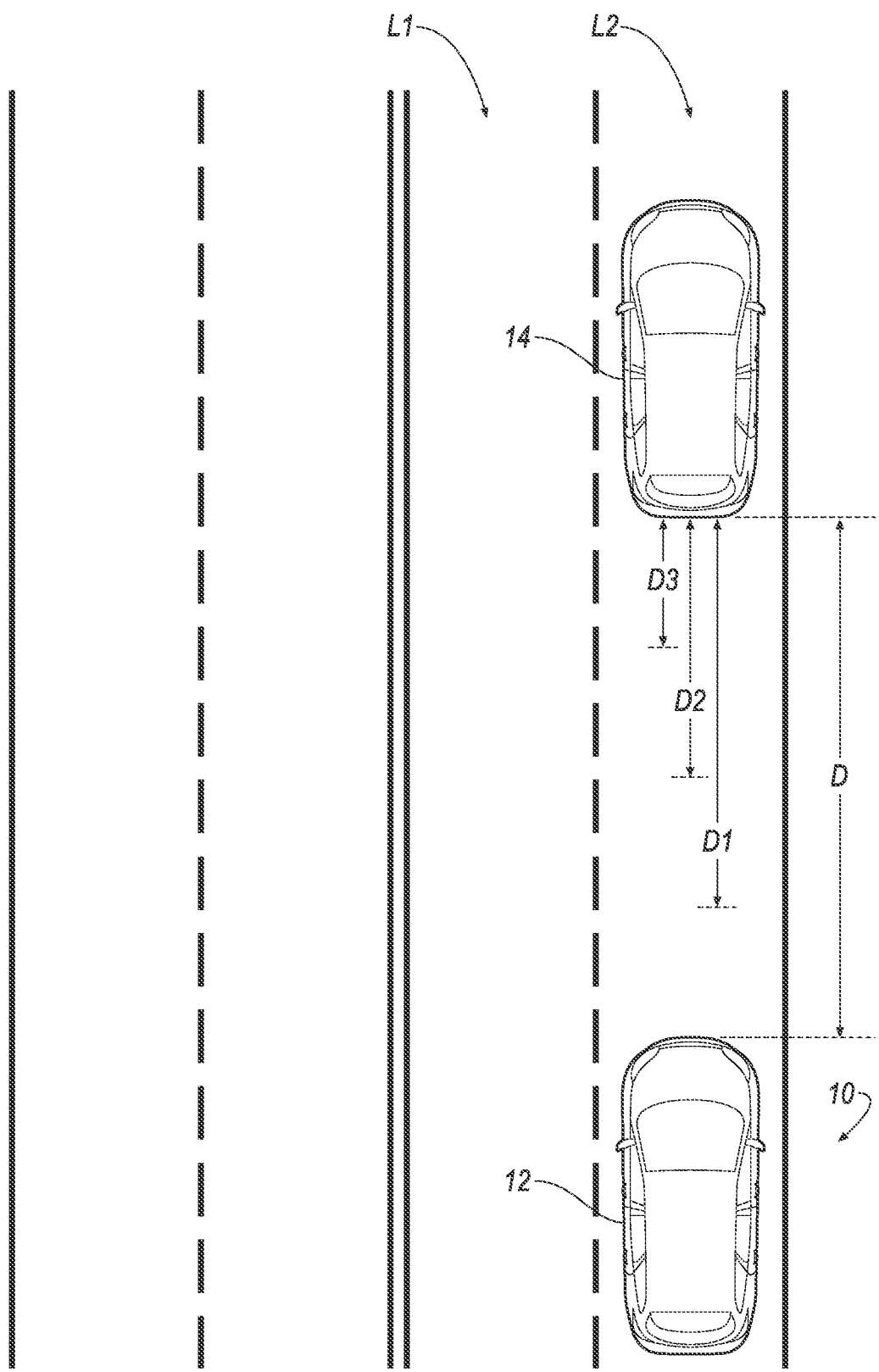
FIG. 1 is top view of a primary vehicle and a secondary vehicle in a same lane.

A system includes a processor and a memory storing instructions executable by the processor to select a distance based on a determination of whether a lane adjacent a primary vehicle and a secondary vehicle in front of the primary vehicle is clear. The instructions include instructions to actuate a braking system of the primary vehicle when the primary vehicle is at the distance from the secondary vehicle.

The instructions may further include instructions to actuate the braking system based on a determination of whether the primary vehicle is indicating a lane change.

The instructions may include instructions to identify actuation of a turn signal of the primary vehicle as indicating the lane change.

The instruction may further include instructions to actuate the braking system to decelerate the primary vehicle at a first rate or a second rate that is less than the first rate based on the determination of whether the lane is clear.

The instructions may further include instructions to actuate the braking system at a first distance from the secondary vehicle upon determining the lane adjacent the secondary vehicle is not clear.

The instructions may further include instructions to actuate the braking system at a second distance from the secondary vehicle that is less than the first distance upon determining the lane adjacent the secondary vehicle is clear.

The instructions may further include instructions to actuate the braking system at a third distance from the secondary vehicle that is less than the second distance upon determining the primary vehicle is indicating a lane change.

The instructions may further include instructions to determine the secondary vehicle is in a same lane as the primary vehicle.

A method includes selecting a distance based a determination of whether a lane adjacent a primary vehicle and a secondary vehicle in front of the primary vehicle is clear. The method includes actuating a braking system of the primary vehicle when the primary vehicle is at the distance from the secondary vehicle.

The method may include actuating the braking system based on a determination of whether the primary vehicle is indicating a lane change.

The method may include identifying actuation of a turn signal of the primary vehicle as indicating the lane change.

The method may include actuating the braking system to decelerate the primary vehicle at a first rate or a second rate that is less than the first rate based on the determination of whether the lane adjacent the secondary vehicle is clear.

The method may include actuating the braking system at a first distance from the secondary vehicle upon determining the lane adjacent the secondary vehicle is not clear.

The method may include actuating the braking system at a second distance from the secondary vehicle that is less than the first distance upon determining the lane adjacent the secondary vehicle is clear.

The method may include actuating the braking system at a third distance from the secondary vehicle that is less than the second distance upon determining the primary vehicle is indicating a lane change.

The method may include determining the secondary vehicle is in a same lane as the primary vehicle.

A system includes means for selecting a distance based a determination of whether a lane adjacent a primary vehicle and a secondary vehicle in front of the primary vehicle is clear. The system includes means for actuating a braking system of the primary vehicle when the primary vehicle is at the distance from the secondary vehicle.

The system may include means for actuating the braking system of the primary vehicle based on a determination of whether the primary vehicle is indicating a lane change.

The system may include means for actuating the braking system to decelerate the primary vehicle at a first rate or a second rate that is less than the first rate based on the determination of whether the lane adjacent the secondary vehicle is clear.

The system may include means for actuating the braking system at a first distance from the secondary vehicle upon determining the lane adjacent the secondary vehicle is not clear, and for actuating the braking system at a second distance from the secondary vehicle that is less than the first distance upon determining the lane adjacent the secondary vehicle is clear.

Figure 2:
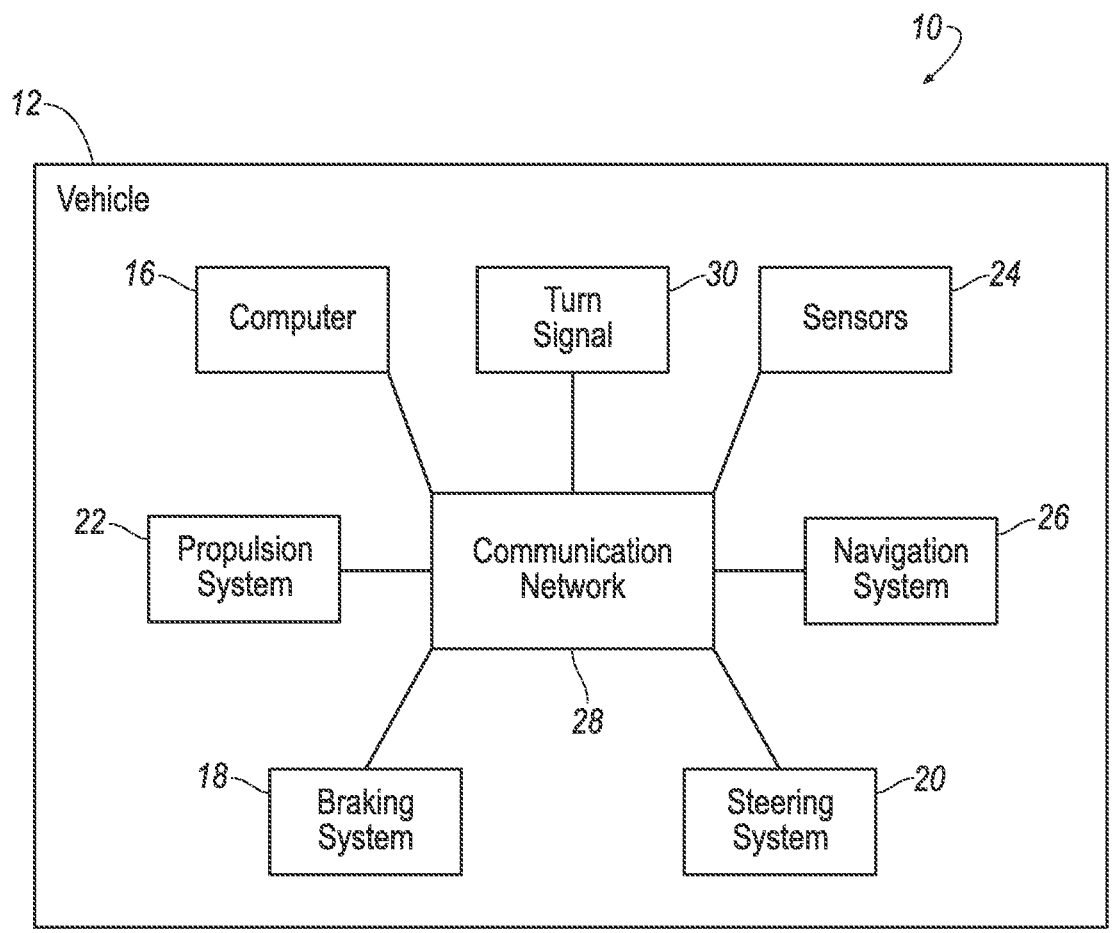
FIG. 2 is a block diagram of components of the primary vehicle.

With reference to FIGS. 1 and 2, wherein like numerals indicate like parts throughout the several views, a system 10 for operating a primary vehicle 12, e.g., to provide adaptive cruise control, includes a computer 16 having a processor and a memory storing instructions executable by the processor to select a distance based a determination of whether a lane L1 adjacent the primary vehicle 12 and a secondary vehicle 14 in front of the primary vehicle 12 is clear. The instructions stored in the memory and executable by the processor include instructions to actuate the braking system 18 of the primary vehicle 12 when the primary vehicle 12 is at the distance from the secondary vehicle 14.

The system 10 provides adaptive cruise control of the primary vehicle 12 with a balance between actuation of the braking system 18 at a low rate (e.g., to slowly decelerate the primary vehicle 12) at a high distance from the secondary vehicle 14, e.g., to increase occupant comfort, and actuation of the braking system 18 at a high rate (e.g., to quickly decelerate the primary vehicle 12) at a low distance from the secondary vehicle 14, e.g., to permit the primary vehicle 12 to refrain from changing speed as the primary vehicle 12 approaches the secondary vehicle 14 when a lane change is anticipated.

Apparatus

The primary vehicle 12 may be any type of passenger or commercial automobile such as a car, a truck, a sport utility vehicle, a crossover vehicle, a van, a minivan, a taxi, a bus, etc.

The primary vehicle 12 may include a steering system 20. The steering system 20 controls a steering angle of wheels of the primary vehicle 12, e.g., in response to an instruction from the computer 16 and/or in response to an operator input, such as to a steering wheel. The steering system 20 may be a rack-and-pinion system with electric power-assisted steering, a steer-by-wire system, or any other suitable system for controlling the steering angle of the wheels. The steering system 20 may be in communication with the computer 16.

The primary vehicle 12 includes the braking system 18. The braking system 18 resists motion of the primary vehicle 12 to thereby slow and/or stop the primary vehicle 12, e.g., in response to an instruction from the computer 16 and/or in response to an operator input, such as to a brake pedal. The braking system 18 may include friction brakes such as disc brakes, drum brakes, band brakes, and so on; regenerative brakes; any other suitable type of brakes; or a combination. The braking system 18 may be in communication with the computer 16.

The primary vehicle 12 includes a propulsion system 22. The propulsion system 22 translates energy into motion of the primary vehicle 12, e.g., in response to an instruction from the computer 16 and/or in response to an operator input, such as to an accelerator pedal. For example, the propulsion system 22 may include a conventional powertrain having an internal-combustion engine coupled to a transmission that transfers rotational motion to wheels; an electric powertrain having batteries, an electric motor, and a transmission that transfers rotational motion to the wheels; a hybrid powertrain having elements of the conventional powertrain and the electric powertrain; or any other type of structure for providing motion to the primary vehicle 12. The propulsion system 22 may be in communication with the computer 16.

The primary vehicle 12 includes sensors 24. The sensors 24 may detect internal states of the primary vehicle 12, for example, wheel speed, wheel orientation, and engine and transmission variables. The sensors 24 may detect the position or orientation of the primary vehicle 12, for example, global positioning system (GPS) sensors; accelerometers such as piezo-electric or microelectromechanical systems (MEMS) sensors; gyroscopes such as rate, ring laser, or fiber-optic gyroscopes; inertial measurements units (IMU); and magnetometers. The sensors 24 may detect the external world, for example, radar sensors, scanning laser range finders, light detection and ranging (LIDAR) devices, and image processing sensors such as cameras. The primary vehicle 12 may further include communications devices, for example, vehicle-to-infrastructure (V2I) or vehicle-to-vehicle (V2V) devices.

The primary vehicle 12 typically includes a navigation system 26 that can determine a location of the primary vehicle 12. The navigation system 26 is implemented via circuits, chips, or other electronic components. The navigation system 26 may be implemented via satellite-based system such as the Global Positioning System (GPS). The navigation system 26 may triangulate the location of the primary vehicle 12 based on signals received from various satellites in the Earth's orbit. The navigation system 26 is programmed to output signals representing the location of the primary vehicle 12 to, e.g., the computer 16 via a communication network 28. In some instances, the navigation system 26 is programmed to determine a route from the present location to a future location. The navigation system 26 may access a virtual map stored in memory of the navigation system 26 and/or computer 16, and develop the route according to the virtual map data. The virtual map data may include lane information, including a number of lanes of a road, widths and edges of such lanes, etc.

A communication network 28 includes hardware, such as a communication bus, for facilitating communication among primary vehicle components, such as the computer 16, the propulsion system 22, the steering system 20, the navigation system 26, the braking system 18, and the sensors 24. The communication network 28 may facilitate wired or wireless communication among the primary vehicle components in accordance with a number of communication protocols such as controller area network (CAN), Ethernet, WiFi, Local Interconnect Network (LIN), and/or other wired or wireless mechanisms.

The computer 16, implemented via circuits, chips, or other electronic components, is included in the system 10 for carrying out various operations, including as described herein. The computer 16 is a computing device that generally includes a processor and a memory, the memory including one or more forms of computer-readable media, and storing instructions executable by the processor for performing various operations, including as disclosed herein. The memory of the computer 16 further generally stores remote data received via various communications mechanisms; e.g., the computer 16 is generally configured for communications on the communication network 28 or the like, and/or for using other wired or wireless protocols, e.g., Bluetooth, etc. The computer 16 may also have a connection to an onboard diagnostics connector (OBD-II). Via the communication network 28 and/or other wired or wireless mechanisms, the computer 16 may transmit messages to various devices in the primary vehicle 12 and/or receive messages from the various devices, e.g., the steering system 20, the braking system 18, the propulsion system 22, the navigation system 26, the sensors 24, etc. Although one computer 16 is shown in FIG. 2 for ease of illustration, it is to be understood that the computer 16 could include, and various operations described herein could be carried out by, one or more computing devices.

The computer 16 is programmed to, i.e., the memory stores instruction executable by the processor to, actuate the braking system 18. For example, the computer 16 may transmit an instruction to the braking system 18 via the communication network 28 instructing the braking system 18 to slow the primary vehicle 12. The instruction may indicate a rate at which to slow the primary vehicle 12, e.g., a percent of total braking ability (such as 50%), a deceleration amount (such as 3 feet per second per second), etc.

The computer 16 is programmed to identify one or more secondary vehicles 14. The computer 16 may identify secondary vehicles 14 based on data from the sensors 24 received via the communication network 28. The computer 16 may identify one or more secondary vehicles 14 based on a size, shape, color, brightness, etc., of objects represented by data received from the sensors 24, e.g., image data for a camera and/or data from a LIDAR sensor, etc., e.g., using known image recognition and data processing techniques.

The computer 16 is programmed to determine whether the secondary vehicle 14 is in a same lane L2 as the primary vehicle 12. The computer 16 may determine that the secondary vehicle 14 is in a same lane L2 as the primary vehicle 12 based on data from the sensors 24. For example, the computer 16 may use image data from a camera to identify lane markers of the lane L2 of the primary vehicle 12 according to image recognition techniques and may identify that the secondary vehicle 14 is between such lane markers. As another example, the computer 16 may identify a position of the secondary vehicle 14 relative to the primary vehicle 12, e.g., within 5 degrees of being within a vehicle forward direction relative to the primary vehicle 12, based on image data from a camera and/or data from a LIDAR sensor.

The computer 16 is programmed to determine a distance D from the primary vehicle 12 to the secondary vehicle 14 in the same lane L2 as the primary vehicle 12. The computer 16 may determine the distance D from the primary vehicle 12 to such secondary vehicle 14 based on data from the sensors 24. For example, the computer 16 may use image data from a pair of cameras, e.g., based on binocular disparity analysis of the secondary vehicle 14 in such image data. As another example, the computer 16 may use data from a LIDAR sensor that indicates the distance D. As a final example, the computer 16 may use data from a sonar sensor, radar sensor, etc., configured to determine the distance D to an object in front of the primary vehicle 12.

The computer 16 is programmed to determine whether a lane L1 adjacent the primary vehicle 12 and the secondary vehicle 14 in the same lane L2 as the primary vehicle 12 is clear. As used herein, a lane is clear when no object is detected within such lane that may interfere with navigation of the primary vehicle 12 to the adjacent lane L1. In the present context, the lane L1 "adjacent" the primary vehicle 12 is a lane L1 immediately next to the lane L2 occupied by the primary vehicle 12, i.e., with no intervening lane(s). An object may interfere with navigation of the primary vehicle 12 to the adjacent lane L1 when it is likely that the primary vehicle 12 would collide with the object if the primary vehicle navigated to the adjacent lane L1 without a change in speed. The computer 16 may detect objects that may interfere with navigation of the primary vehicle 12 to the adjacent lane L1 based on data from the sensors 24. For example, the primary vehicle 12 may be navigated, e.g., by the computer 16 and/or a human operator, to a lane L1 adjacent the primary vehicle 12 that is clear of secondary vehicles 14 when changing lanes to pass the secondary vehicle 14. The computer 16 may determine the lane L1 adjacent the primary vehicle 12 is clear based on data from the sensors 24. For example, image data from a camera, data from a LIDAR sensor, etc., may indicate that a secondary vehicle is not present in the adjacent lane L1.

The computer 16 is programmed to determine whether the primary vehicle 12 is indicating a lane change Indicating a lane change means that the primary vehicle 12 manifests one or more physical states detectable by the computer 16 in which the primary vehicle 12 is deemed more likely to navigate to the lane L1 adjacent the primary vehicle 12 as compared to when such condition is not detected. For example, the computer 16 may identify actuation of a turn signal 30 of the primary vehicle 12 as indicating the lane change. The computer 16 may determine the turn signal 30 has been actuated based on data from a sensor 24, e.g., indicating a human operator has actuated a turn signal switch. As another example, the computer 16 may determine the primary vehicle 12 is indicating a lane change based on lateral acceleration of the vehicle, e.g., indicated by data from the sensors 24, based on image a data from a camera indicating the primary vehicle 12 is approaching or crossing a boundary between the lane L2 the primary vehicle 12 is in and the lane L1 that is adjacent, etc. As one more example the computer 16 may determine the primary vehicle 12 is indicating a lane change based on data from the navigation system 26, e.g., indicting the primary vehicle 12 is approaching or crossing a boundary between the lane L2 the primary vehicle 12 is in and the lane L1 that is adjacent.

The computer 16 is programmed to select a distance based one or more of a determination of whether the lane L1 adjacent the primary vehicle 12 and the secondary vehicle 14 in front of the primary vehicle 12 is clear and a determination of whether the primary vehicle 12 is indicating a lane change. In addition to selecting the distance, the computer 16 may also select a rate at which to actuate the braking system 18. For example, the computer 16 may store in memory a look-up table or the like associating whether the lane L1 adjacent the primary vehicle 12 is clear and whether the primary vehicle 12 is indicating a lane change with distances and rates at which to actuate the braking system 18. An example look-up table is shown below in Table 1:

TABLE 1

| Adjacent Lane Clear? | Lane Change Indicated? | Distance | Rate |
|---|---|---|---|
| No | n/a | $1^{st}$ Distance | $1^{st}$ Rate |
| Yes | No | $2^{nd}$ Distance | $2^{nd}$ Rate |
| Yes | Yes | $3^{rd}$ Distance | $3^{rd}$ Rate |

The first distance D1 is greater than the second distance D2, and the second distance D2 is greater than the third distance D3. The first rate is lower than the second rate, and the second rate is lower than the third rate. The different distances and rates provide for the primary vehicle 12 to be slowed when approaching the secondary vehicle 14 in a manner to provide greater comfort to occupants of the primary vehicle 12. For example, the first distance D1 and first rate enable slow deceleration of the primary vehicle 12 to match a speed of the secondary vehicle 14 when it is unlikely that the primary vehicle 12 will change lanes, e.g., when the lane L1 adjacent to the primary vehicle 12 is not clear. The slow declaration is less likely to cause the occupant to experience an uncomfortable feeling. As another example, the third distance D3 and the third rate enable the primary vehicle 12 to maintain a current speed when it is likely that the primary vehicle 12 will navigate to the lane L1 adjacent to the primary vehicle 12 and pass the secondary vehicle 14, e.g., when the lane L1 adjacent to the primary vehicle 12 is clear and the primary vehicle 12 is indicating a lane change. The adjectives "first," "second," etc., are used throughout this document as identifiers and are not intended to signify importance or order.

The distances and rates may be predetermined and stored on memory of the computer 16, e.g., based on empirical testing. For example, the first distance D1 and the first rate may be determined based on occupant survey data indicating a preferred distance and rate at which occupants are most comfortable. As another example, the third distance D3 and the third rate may be determined based on performance data of the primary vehicle 12 indicating a minimum distance and maximum rate at which the braking system 18 may be actuated to avoid impacting the secondary vehicle 14. As a final example, the second distance D2 and the second rate may be between the first distance D1 and the first rate, and the third distance D3 and the third rate, respectively. Additionally or alternatively, the computer 16 may determine the distances and the rates based on relative speeds of the primary vehicle 12 and the secondary vehicle 14, i.e., how quickly the primary vehicle 12 is approaching the secondary vehicle 14, e.g., using known impact avoidance and adaptive cruise control methods.

The computer 16 is programmed to actuate the braking system 18 of the primary vehicle 12. For example, the computer 16 may transmit an instruction to the braking system 18 via the communication network 28. The communication may specify the selected rate at which to decelerate the primary vehicle 12. The computer 16 may transmit the instruct to the braking system 18 when the vehicle is at the selected distance. For example, the computer 16 may instruct the braking system 18 to actuate at the first rate when the distance D between the secondary vehicle 14 and the primary vehicle 12 is less than or equal to the first distance D1 and upon determining the lane L1 adjacent the primary vehicle 12 is not clear. As another example, the computer 16 may instruct the braking system 18 to actuate at the second rate when the distance D between the secondary vehicle 14 and the primary vehicle 12 is less than or equal to the second distance D2 and upon determining the lane L1 adjacent the primary vehicle 12 is clear and that the primary vehicle 12 is not indicating a lane change. As a third example, the computer 16 may instruct the braking system 18 to actuate at the third rate when the distance D between the secondary vehicle 14 and the primary vehicle 12 is less than or equal to the third distance D3 and upon determining the lane L1 adjacent the primary vehicle 12 is clear and the primary vehicle 12 is indicating a lane change.

Process

Figure 3:
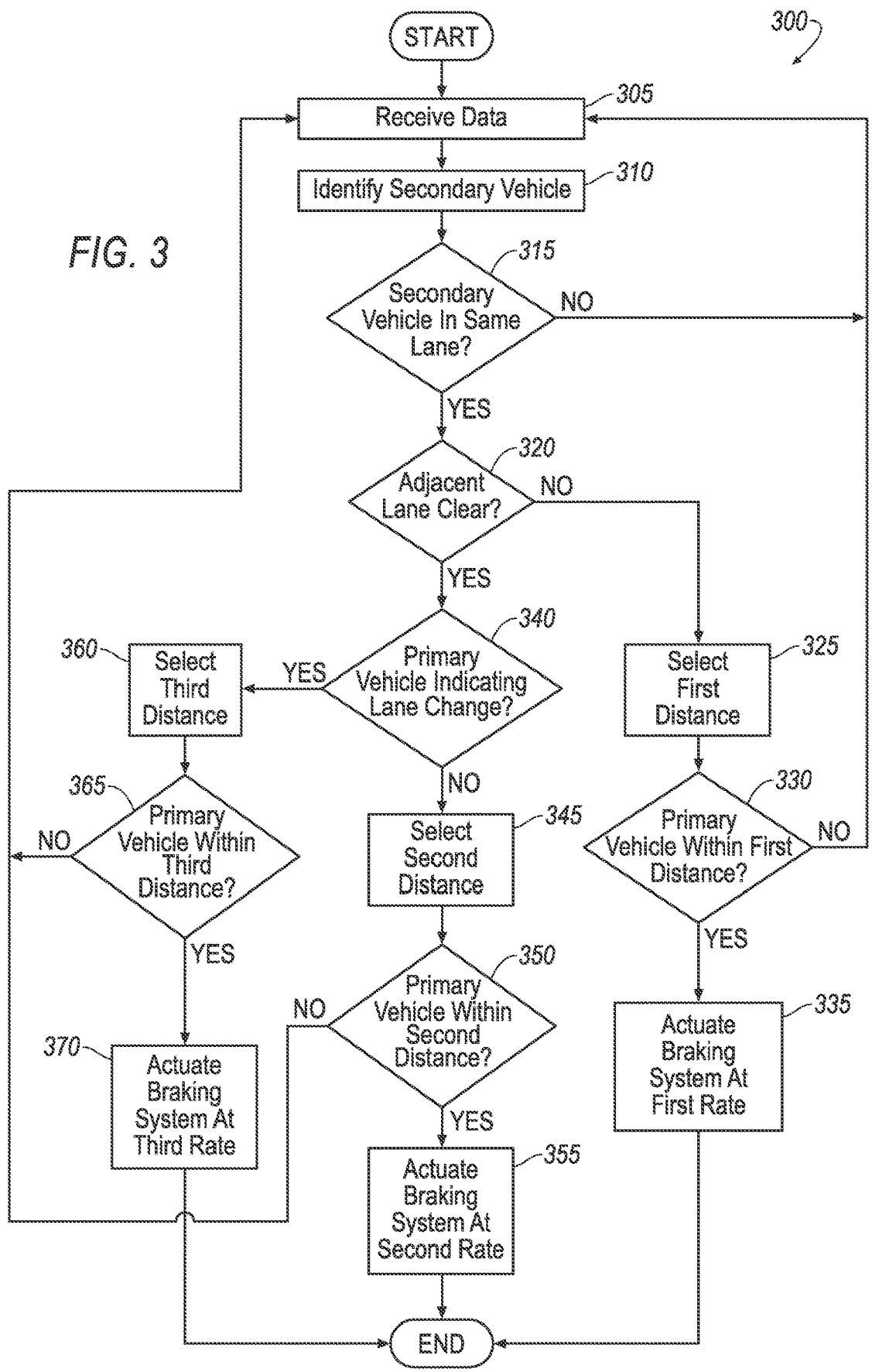
FIG. 3 is an illustration of a process for controlling the primary vehicle.

FIG. 3 is a process flow diagram illustrating an exemplary process 300 for operating the system 10. The process 300 begins in a block 305 where the computer 16 receives data from the sensors 24, the navigation system 26, etc., e.g., via the communication network 28. The computer 16 may receive such data substantially continuously or at time intervals, e.g., every 50 milliseconds. The computer 16 may store the data, in the memory.

Next at a block 310 the computer 16 identifies the secondary vehicle 14 based on data from the sensors 24.

Next at a block 315 the computer 16 determines whether the secondary vehicle 14 identified in the block 310 is in a same lane L2 as the primary vehicle 12 based on information from the sensors 24. Upon determining the secondary vehicle 14 is in the same lane L2 the process 300 moves to a block 320. Upon determining the secondary vehicle 14 is not in the same lane L2 the process 300 returns to the block 305.

At the block 320 the computer 16 determines whether the lane L1 adjacent the primary vehicle 12 and the secondary vehicle 14 identified in the block 310 identified is clear based on data from the sensors 24. Upon determining the lane L1 adjacent the primary vehicle 12 is not clear, e.g., another secondary vehicle is occupying the lane L1 adjacent the primary vehicle 12, the process 300 moves to a block 325. Upon determining the lane L1 adjacent the primary vehicle 12 is clear, e.g., another secondary vehicle is not occupying the lane L1 adjacent the primary vehicle 12, the process 300 moves to a block 340.

At the block 325 the computer 16 selects a first distance D1 and a first rate.

Next at a block 330 the computer 16 determines whether the primary vehicle 12 is within the first distance D1 of the secondary vehicle 14 identified in the block 310 based on data from the sensors 24. Upon determining the primary vehicle 12 is within the first distance D1 of the secondary vehicle 14 the process 300 moves to a block 335. Upon determining the primary vehicle 12 is not within the first distance D1 of the secondary vehicle 14 the process 300 returns to the block 305.

At the block 335 the computer 16 actuates the braking system 18 to decelerate the vehicle at the first rate, by transmitting an instruction to the braking system 18. After the block 335, the process 300 may end. Alternately the process 300 may return to the block 305.

At the block 340 the computer 16 determines whether the primary vehicle 12 is indicating a lane change, based on data from the sensors 24 and/or the navigation system 26. Upon determining the primary vehicle 12 is not indicating a lane change the process 300 moves to a block 345. Upon determining the primary vehicle 12 is indicating a lane change the process 300 moves to a block 360.

At the block 345 the computer 16 selects a second distance D2 that is less than the first distance D1 and a second rate that is greater than the first rate.

Next at a block 350 the computer 16 determines whether the primary vehicle 12 is within the second distance D2 of the secondary vehicle 14 identified in the block 310 based on data from the sensors 24. Upon determining the primary vehicle 12 is within the second distance D2 of the secondary vehicle 14 the process 300 moves to a block 355. Upon determining the primary vehicle 12 is not within the second distance D2 of the secondary vehicle 14 the process 300 returns to the block 305.

At the block 355 the computer 16 actuates the braking system 18 to decelerate the vehicle at the second rate by transmitting an instruction to the braking system 18. After the block 355, the process 300 may end. Alternately the process 300 may return to the block 305.

At the block 360 the computer 16 selects a third distance D3 that is less than the second distance D2 and the third rate that is greater than the second rate.

Next at a block 365 the computer 16 determines whether the primary vehicle 12 is within the third distance D3 of the secondary vehicle 14 identified in the block 310 based on data from the sensors 24. Upon determining the primary vehicle 12 is within the third distance D3 of the secondary vehicle 14 the process 300 moves to a block 370. Upon determining the primary vehicle 12 is not within the third distance D3 of the secondary vehicle 14 the process 300 returns to the block 305.

At the block 370 the computer 16 actuates the braking system 18 to decelerate the vehicle at the third rate by transmitting an instruction to the braking system 18. After the block 370, the process 300 may end. Alternately the process 300 may return to the block 305.

Conclusion

With regard to the process 300 described herein, it should be understood that, although the steps of such process 300 have been described as occurring according to a certain ordered sequence, such process 300 could be practiced with the described steps performed in an order other than the order described herein. It further should be understood that certain steps could be performed simultaneously, that other steps could be added, or that certain steps described herein could be omitted. In other words, the description of the process 300 herein is provided for the purpose of illustrating certain embodiments and should in no way be construed so as to limit the disclosed subject matter.

Computing devices, such as the computer 16, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, computing modules, etc.), stored on computer readable media associated therewith (e.g., disks, memories, etc.). A computer program product may comprise such instructions stored on computer readable media for carrying out the functions described herein.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system, comprising:
a processor; and
a memory storing instructions executable by the processor to:
determine whether a lane adjacent a primary vehicle and a secondary vehicle is clear;
upon determining the lane adjacent is not clear, select a first distance and a first rate for actuating a braking system of the vehicle;
upon determining the lane adjacent is clear, select a second distance and a second rate for actuating the braking system of the vehicle, the second distance less than the first distance and the second rate greater than the first rate; and
actuate the braking system of the primary vehicle at the selected first rate or second rate when the primary vehicle is at the selected first distance or second distance from the secondary vehicle.

2. The system of claim 1, the instructions further including instructions to actuate the braking system based on a determination of whether the primary vehicle is indicating a lane change.

3. The system of claim 2, the instructions further including instructions to identify actuation of a turn signal of the primary vehicle as indicating the lane change.

4. The system of claim 1, the instructions further including instructions to actuate the braking system at a third distance from the secondary vehicle that is less than the second distance upon determining the primary vehicle is indicating a lane change.

5. The system of claim 1, further comprising the primary vehicle having the braking system, and wherein the processor and memory are supported by the primary vehicle.

6. A method, comprising:
determining whether or not a lane adjacent a primary vehicle and a secondary vehicle is clear;
upon determining the lane adjacent is not clear, selecting a first distance and a first rate for actuating a braking system of the vehicle;
upon determining the lane adjacent is clear, selecting a second distance and a second rate for actuating the braking system of the vehicle, the second distance less than the first distance and the second rate greater than the first rate;
and
actuating the braking system of the primary vehicle at the selected first rate or second rate when the primary vehicle is at the selected first distance or second distance from the secondary vehicle.

7. The method of claim 6, further comprising actuating the braking system based on a determination of whether the primary vehicle is indicating a lane change.

8. The method of claim 7, further comprising identifying actuation of a turn signal of the primary vehicle as indicating the lane change.

9. The method of claim 6, further comprising actuating the braking system at a third distance from the secondary vehicle that is less than the second distance upon determining the primary vehicle is indicating a lane change.

10. A system, comprising:
a primary vehicle having a braking system;
means for determining whether or not a lane adjacent the primary vehicle and a secondary vehicle is clear;
means for, upon determining the lane adjacent is not clear, selecting a first distance and a first rate for actuating a braking system of the vehicle;
means for, upon determining the lane adjacent is clear, selecting a second distance and a second rate for actuating the braking system of the vehicle, the second distance less than the first distance and the second rate greater than the first rate;
and
means for actuating the braking system of the primary vehicle at the selected first rate or second rate when the primary vehicle is at the selected first distance or second distance from the secondary vehicle.

11. The system of claim 10, further comprising means for actuating the braking system of the primary vehicle based on a determination of whether the primary vehicle is indicating a lane change.

* * * * *